June 4, 1963   A. ROSENFELD ET AL   3,092,757
CIRCUIT MEANS FOR PREVENTING SPIKE OR SURGES
AT THE OUTPUT OF A POWER SUPPLY
Filed Aug. 1, 1958
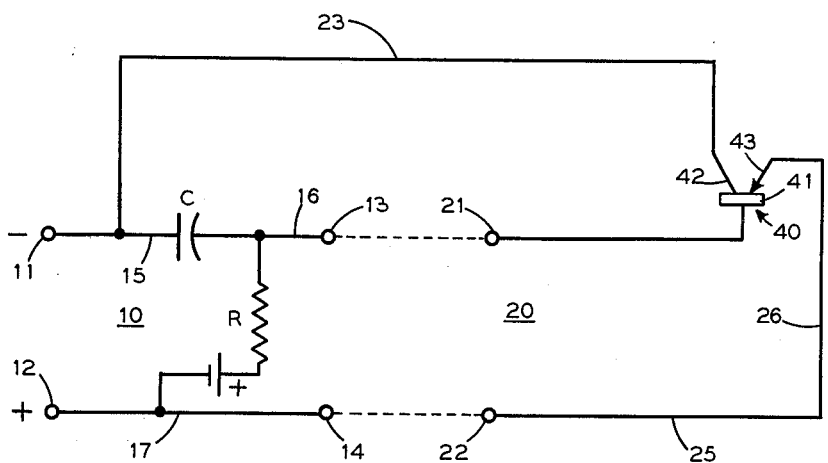
INVENTORS
Aaron Rosenfeld
Kenneth Kupferberg
BY
ATTORNEY

United States Patent Office 3,092,757
Patented June 4, 1963

3,092,757
CIRCUIT MEANS FOR PREVENTING SPIKE OR SURGES AT THE OUTPUT OF A POWER SUPPLY
Aaron Rosenfeld, Jackson Heights, and Kenneth Kupferberg, Flushing, N.Y., assignors to Forbro Design Inc., New York, N.Y., a corporation of New York
Filed Aug. 1, 1958, Ser. No. 752,484
7 Claims. (Cl. 317—16)

This invention relates to electronic power supplies and, more particularly, to novel circuit means for preventing a voltage spike, surge, or sudden peak from appearing at the output terminals of an electronic power supply.

Such spikes or surges may be the result of any one or more of a number of causes. One of the more common causes is a rapid reduction in the load current through a power supply having a series inductance. Irrespective of the cause, however, it is desirable to eliminate such a spike or surge, particularly where a power supply is used with circuitry that is sensitive to such a surge and possibly damaged by a spike or surge.

In accordance with the present invention, a surge or spike is effectively eliminated by a two part device or circuit arrangement comprising a rate of change of voltage or current indicator or sensing device in operative association with a power absorbing device or circuit arrangement. The rate of change indicator may be, by way of example, a differentiating circuit, and the power absorbing device may be a circuit arrangement including transistors.

The input terminals of the rate of change indicator or sensing device are connected to the output terminals of the power supply, and the sensing device has output terminals connected to the power absorbing device. When a spike or surge is applied to the input terminals of the sensing device, the latter detects the spike or surge as a sudden change in voltage. The sensing device applies to the power absorbing device a voltage which is a function of the rate of change of the voltage applied to the input of the sensing device.

In effect, the sensing device applies to the power absorbing device a voltage which may be approximated by $dv/dt$, where $v$ is the input voltage to the sensing device. The greater the rate of change in the input voltage applied to the sensing device, the greater will be the voltage applied to the power absorbing device and the greater will be the energy absorbed by the latter. Conversely, when there is no change in the input voltage to the sensing device, there is no voltage applied to the power absorbing device and no energy absorbed by the latter.

For an understanding of the invention principles, reference is made to the following description of a typical embodiment thereof as illustrated in the accompanying drawing. In the drawing, the single FIGURE is a schematic wiring diagram of one form of spike or surge eliminator embodying the invention.

Referring to the drawing, the invention is illustrated as comprising a sensing circuit 10 and a power absorbing circuit 20. Sensing circuit 10 has input terminals 11, 12, which may be connected to an electronic power supply, and output terminals 13, 14. A conductor 15 connects terminal 11 to a condenser C, and a conductor 16 connects condenser C to terminal 13. A conductor 17 connects terminal 12 to terminal 14, and a resistance R is connected between conductors 16 and the positive terminal of a biasing cell 18.

Terminals 13 and 14 are connected to terminals 21 and 22 of power absorbing circuit 20. A transistor 40 in circuit 20 has a base electrode 41, a collector electrode 42, and an emitter electrode 43.

Terminal 21 is connected to base electrode 41 of transistor 40. A conductor 23 connects collector electrode 42 of transistor 40 to input terminal 11 of circuit 10. Conductor 26 connects emitter electrode 43 to a conductor 25 connected to terminal 22.

The values of condenser C and resistance R are so selected that the combination thereof provides a time constant such that the voltage at terminals 13, 14 is a derivative of the voltage or signal at input terminals 11, 12. When this derivative voltage has a negative value, as when the voltage applied to terminals 11, 12 is increasing, the derivative voltage, applied to terminals 21, 22, triggers circuit 20 in such a manner that the emitter to base bias of transistor 40 renders this transistor conductive. The transistor thus absorbs energy from terminals 11, 12 connected to the power supply.

The amount of energy thus absorbed is proportional to the emitter to base bias which, in turn, is proportional to the derivative voltage across terminals 13, 14. This derivative voltage, in turn, is proportional to the rate of change of the power supply output voltage across terminals 11, 12. The combined effect of the operation of circuits 10 and 20 is to eliminate or clip any increase in voltage appearing at the output of the power supply at terminals 11 and 12.

While a specific embodiment of the invention has been shown and described in detail to illustrate the application of the invention principles, it will be understood that the invention may be embodied otherwise without departing from such principles.

What is claimed is:

1. A voltage clipping arrangement, for clipping voltage spikes at the output of a power supply, comprising, in combination, a sensing device having input terminals and output terminals and operable, responsive to sharp increases in the input voltage applied to its input terminals, to provide a potential across its output terminals proportional to the rate of increase of the input voltage; means for applying the power supply output voltage to be regulated to said input terminals; and a power absorbing device connected to said input terminals and said output terminals and triggered, responsive to a potential across said output terminals, to absorb sufficient power from said input terminals to reduce the spike voltage by an amount sufficient to maintain substantially constant the voltage applied to said input terminals.

2. A voltage clipping arrangement as claimed in claim 1 in which said sensing means is a differentiating circuit having a time constant such that its output potential is a time derivative of changes in its input voltage.

3. A voltage clipping arrangement as claimed in claim 1 in which said power absorbing device comprises transistor means having driving electrode means biased by the potential across said output terminals and having a follower circuit connected across said input terminals.

4. A voltage clipping arrangement as claimed in claim 1 in which said power absorbing device comprises a transistor having a base electrode and an emitter electrode connected across said output terminals for biasing of said base electrode by the potential across said output terminals, and having its collector electrode and emitter electrode connected across said input terminals.

5. A voltage clipping arrangement as claimed in claim 2 in which said differentiating circuit comprises a resistance and condenser combination.

6. A voltage clipping arrangement as claimed in claim 2 in which said differentiating circuit comprises a resistance across said input terminals and a condenser in series with an input terminal and an output terminal.

7. A voltage clipping arrangement as claimed in claim 6 including a source of bias potential in series with said resistance between said input terminals.

References Cited in the file of this patent

UNITED STATES PATENTS

| | | |
|---|---|---|
| 1,295,885 | Fortescue | Mar. 4, 1919 |
| 1,930,264 | Curtis | Oct. 10, 1933 |
| 2,571,027 | Garner | Oct. 9, 1951 |
| 2,655,610 | Ebers | Oct. 13, 1953 |
| 2,718,613 | Harris | Sept. 20, 1955 |
| 2,809,293 | Rambo | Oct. 8, 1957 |
| 2,832,900 | Ford | Apr. 29, 1958 |
| 2,850,648 | Elliott | Sept. 2, 1958 |
| 2,973,439 | Wright | Feb. 28, 1961 |

FOREIGN PATENTS

| | | |
|---|---|---|
| 1,105,072 | France | June 22, 1955 |

OTHER REFERENCES

Electronic Design, February 15, 1956, pages 38–41.
Electronic Design, April, 1955; pages 36–39.
Electronic Design, May 27, 1959; page 46.